(12) United States Patent
Kushida et al.

(10) Patent No.: US 7,026,771 B2
(45) Date of Patent: Apr. 11, 2006

(54) MOTOR CONTROL APPARATUS AND ELECTRIC APPLIANCE USING THE SAME

(75) Inventors: Hiroyuki Kushida, Kanagawa (JP); Osamu Sakurai, Kanagawa (JP); Akihiro Ishizawa, Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/124,139

(22) Filed: May 9, 2005

(65) Prior Publication Data

US 2005/0253539 A1    Nov. 17, 2005

(30) Foreign Application Priority Data

May 17, 2004    (JP)    ............................. P2004-146654

(51) Int. Cl.
H02P 1/54    (2006.01)
H02P 5/46    (2006.01)
H02P 7/68    (2006.01)
H02P 7/74    (2006.01)
H02P 7/80    (2006.01)

(52) U.S. Cl. ..................... 318/98; 318/807; 318/800; 318/798; 318/802; 318/825

(58) Field of Classification Search .................. 318/98
See application file for complete search history.

(56) References Cited

U.S. PATENT DOCUMENTS 4,267,499 A * 5/1981 Kurosawa .................. 318/800
4,357,729 A   11/1982 Vander Molen et al.
4,578,632 A * 3/1986 Laughton .................... 323/315
4,935,678 A   6/1990 Houst
5,241,256 A * 8/1993 Hatanaka et al. ........... 318/801
5,495,161 A   2/1996 Hunter
5,646,499 A * 7/1997 Doyama et al. ............ 318/801

(Continued)

FOREIGN PATENT DOCUMENTS

JP    9-122052    5/1997

(Continued)

*Primary Examiner*—David Martin
*Assistant Examiner*—Renata McCloud
(74) *Attorney, Agent, or Firm*—DLA Piper Rudnick Gray Cry US LLP

(57) ABSTRACT

A microprocessor of the motor control apparatus acquires a zero-cross detection signal from a zero-cross detection section and a load current from a current detection section at a prescribed sampling period. The processor obtains a load current instant value every sampling period and a corresponding sine-functional value from a sine-functional value table to calculate a compensation value for the load current instant value. The processor also calculates a load current compensation total value by adding the compensation value by the predetermined number of times of sampling and compares the load current compensation total value with a load current reference value to obtain a difference therebetween. In response to the difference, an instruction value for delay time that determines the output timing of a trigger signal to a switching element is changed so that power consumption of the motor falls within a prescribed range.

8 Claims, 13 Drawing Sheets

U.S. PATENT DOCUMENTS

| | | | |
|---|---|---|---|
| 5,850,132 A | * 12/1998 | Garces | 318/599 |
| 6,388,416 B1 | * 5/2002 | Nakatani et al. | 318/700 |
| 6,400,107 B1 | * 6/2002 | Nakatani et al. | 318/254 |
| 6,490,752 B1 | 12/2002 | Kushida | |
| 6,624,606 B1 | 9/2003 | Kushida | |
| 6,664,748 B1 | 12/2003 | Kushida | |
| 6,828,753 B1 | * 12/2004 | Grasso et al. | 318/801 |
| 6,958,589 B1 | * 10/2005 | Kawaji et al. | 318/802 |
| 2004/0231090 A1 | 11/2004 | Kushida | |
| 2005/0097701 A1 | 5/2005 | Kushida | |

FOREIGN PATENT DOCUMENTS

JP    2000-166833    6/2000

* cited by examiner

| Ts | Jg1 | Jg2 |
|---|---|---|
| U0 | X1 | — |
| U1 | X2 | Y1 |
| U2 | X3 | Y2 |
| ⋮ | ⋮ | ⋮ |
| Un-1 | Xn | Yn-1 |
| Un | — | Yn |

~81

MOTOR CONTROL APPARATUS AND ELECTRIC APPLIANCE USING THE SAME

BACKGROUND OF THE INVENTION (1) Field of the Invention

The present invention relates, in general, to a motor control apparatus and, in particular, to an apparatus which controls the operation of an AC driven type motor and an electric appliance which is equipped with such a motor control apparatus.

(2) Description of the Related Art

In an AC driven type motor, a power-control thereof is generally carried out based on a load current value that flows through the motor. However, due to the inductivity of windings of the motor, a phase difference between voltage and current occurs. In addition, impedance of windings varies among motors, respectively. Phenomena that power consumption varies among motors due to the phase difference described above can be observed even if amount of the load current flowing through respective motors is the same. Therefore, it is necessary to regulate variation in the power consumption of motors even a prescribed same voltage is applied to respective motors.

A method for regulating such power consumption generally be taken is that current and voltage are detected by a known method and variation in the power consumption is regulated based on the detected current and voltage. According to this method, a circuit arrangement is complicated because detection of current and voltage is evitable.

SUMMERY OF THE INVENTION

Accordingly, it is an object of the present invention to effectively decrease variation in a power consumption of motor, using a simplified motor control circuit arrangement even if impedance of windings among motors varies.

To accomplish the above-described object, a motor control apparatus which controls the operation of an A.C. driven type motor, comprising:

a switching element which is activated by a trigger signal;

a zero-cross detection section configured to detect a zero-cross point of A.C. power voltage applied to the motor;

a current detection section configured to detect a load current flowing through the motor; and a control section associated with the zero-cross detection section and the current detection section, configured to supply the trigger signal to the switching element, the control section including, a first means for obtaining a load current instant value by sampling the load current detected by the current detection section at a prescribed sampling period, a functional value output means for outputting a sine-functional value in response to the prescribed sampling period of the load current, a total value calculation means for obtaining a compensation value for the load current instant value based on the load current instant value from the first means and the sine-functional value from the functional value output means to calculate a load current compensation total value by adding the compensation values by the number of times of the sampling, and a timing determination means for obtaining a difference by comparing the load current compensation total value with a load current reference value to determine an output timing of the trigger signal to the switching element in response to the difference so that power consumption of the motor falls within a predetermined range.

BRIEF DESCRIPTION OF THE DRAWINGS

These and other objects and advantages of this invention will become apparent and more readily appreciated from the following detailed description of the presently preferred exemplary embodiments of the invention taken in conjunction with the accompanying drawings wherein.

DETAILED DESCRIPTION OF THE INVENTION

Figure 1:
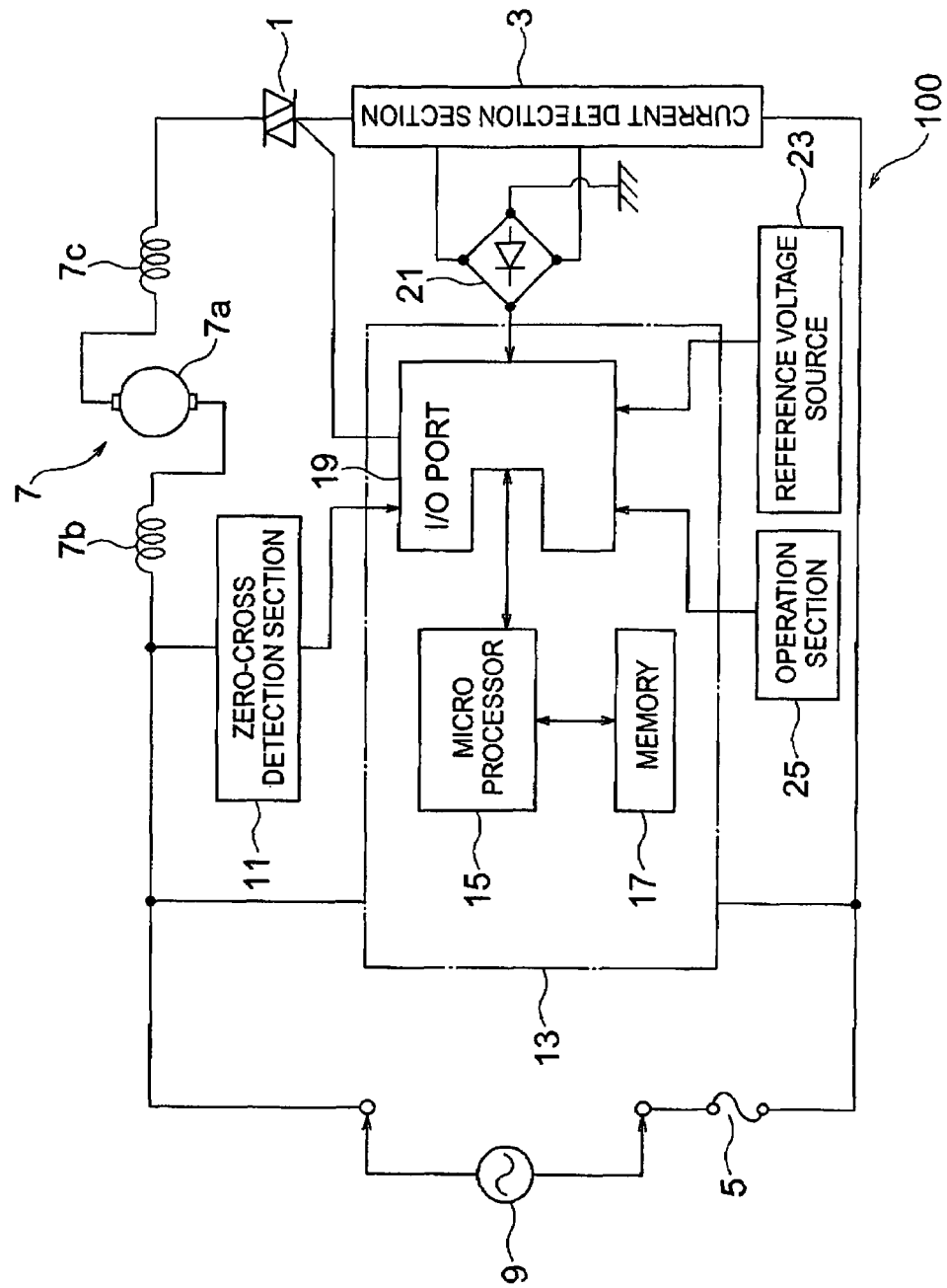
FIG. 1 is a block diagram illustrating a circuitry arrangement of a motor control apparatus according to a first embodiment of the present invention.

The present invention will now be described in more detail with reference to the accompanying drawings. However, the same numerals are applied to the similar elements in the drawings, and therefore, the detailed descriptions thereof are not repeated.

First Embodiment

A first embodiment will be described with reference to FIG. 1. FIG. 1 shows a motor control apparatus 100. A switching element 1, e.g., bi-directional triode thyristor (hereinafter referred to as a TRIAC), a current detection section 3, a current fuse 5, and an AC driven type motor 7 are connected in series with a commercial AC power source 9. TRIAC 1 is activated with a trigger signal and may be replaced by other elements which are also driven with the trigger signal.

Motor 7 is a universal type motor which comprises an armature 7a with a rectifier, and field windings 7b, 7c. Current detection section 3 includes a current-transformer or a shunt-resistance, for example, for detecting a load current flowing through motor 7. A zero-crossing point of AC voltage applied to motor 7 is detected by a zero-cross detecting section 11.

As can be seen in FIG. 1, a control section 13 includes a microprocessor 15, a memory 17, and an I/O port 19. I/O port 19 is equipped with an A/D conversion function. In memory 17, a control program for functionally operating microprocessor 15 and data including several constants needed to carry out operations by microprocessor 15 are stored beforehand. Memory 17 includes a data area for temporarily storing data from microprocessor 15 and a work area for microprocessor 15.

A detection current by current detection section 3 is fed to I/O port 19 after being full-wave-rectified by a full-wave rectifier 21. Then, the full-wave-rectified detection current is converted by A/D function of I/O port 19 from an analog value into a digital value when I/O port 19 acquires the detected current. A zero-cross detection signal detected by zero-cross detecting section 11 is also input to I/O port 19.

A reference voltage source 23 and an operation section 25 are also provided to motor control apparatus 100. An A/D reference voltage from reference voltage source 23 and an instruction signal from operation section 25 are input to I/O port 19, respectively. Therefore, the detection current, the zero-cross detection signal, the reference voltage and the instruction signal are respectively input to control section 13 and then control section 13 outputs a trigger signal to the gate of TRIAC 1.

Figure 2:
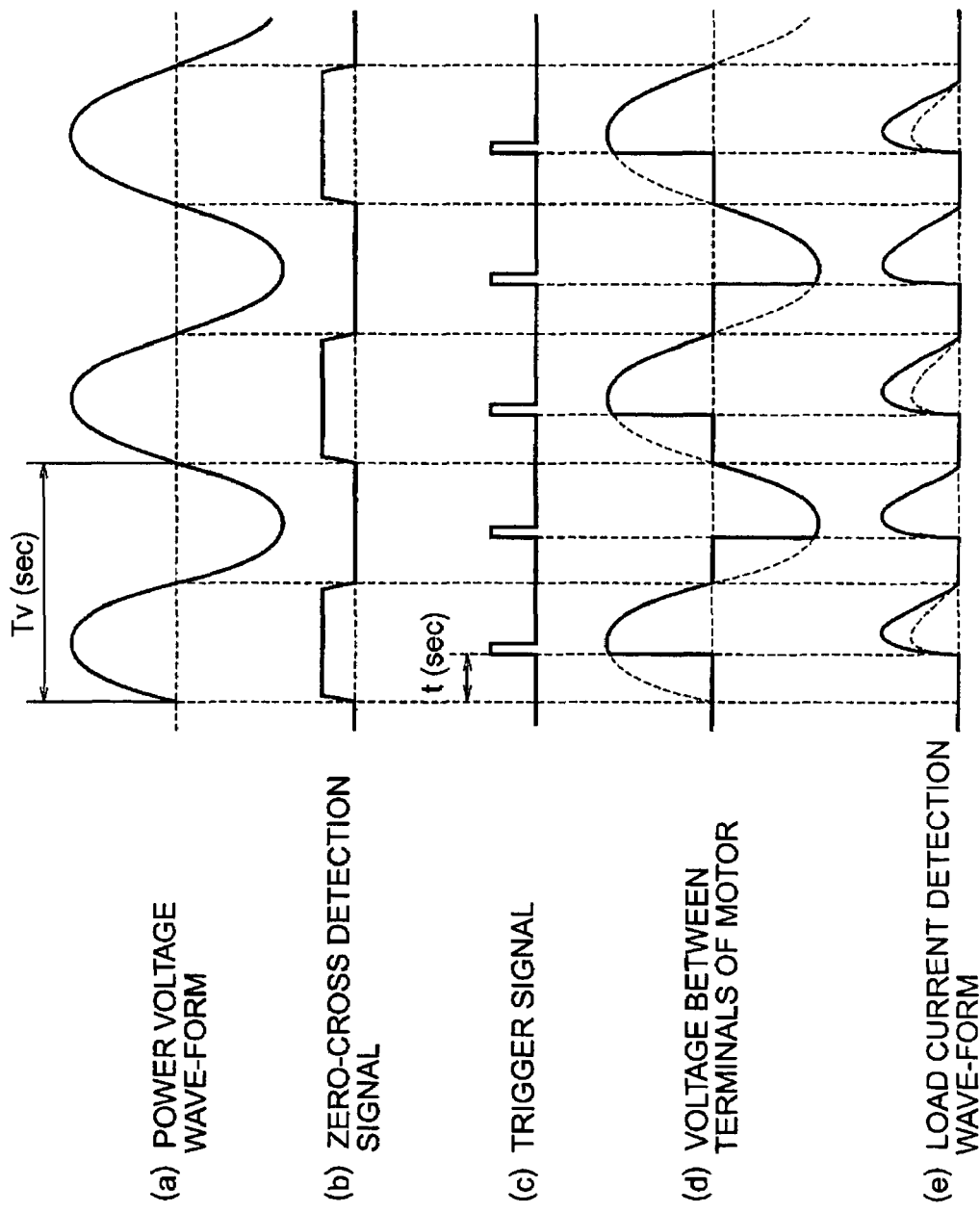
FIG. 2 is a view illustrating a voltage wave-form, a current wave-form, and a signal wave-form from respective sections shown in FIG. 1.

In motor control apparatus 100, when a power voltage having a wave-form indicated in (a) of FIG. 2 from commercial AC power source 9 is applied to TRIAC 1 and the trigger signal from control section 13 is applied to the gate of TRIAC 1 at timings shown in (c) of FIG. 2, TRIAC 1 is conducted with the trigger signal until the polarity of the power voltage is inverted and voltages indicated in (d) of FIG. 2 are applied to between terminals of motor 7.

At this time, the zero-cross detection signal indicated in (b) Of FIG. 2 is input to I/O port 19 of control section 13. A load current detecting wave-form detected by current detection section 3 and full-wave-rectified by full-wave rectifier 21 is shown in (e) of FIG. 2. A conducting angle φ (%) is calculated by the following formula:

$$\phi = \{(Tv/2) - t\}/(Tv/2) \times 100 \quad (1)$$

wherein Tv (see) is a cycle of supply voltage, and t (sec) is a time until a trigger signal is output after the supply voltage comes to the zero-crossing point. Hereafter, the time t (sec) is referred to as a delay time.

Figure 4:
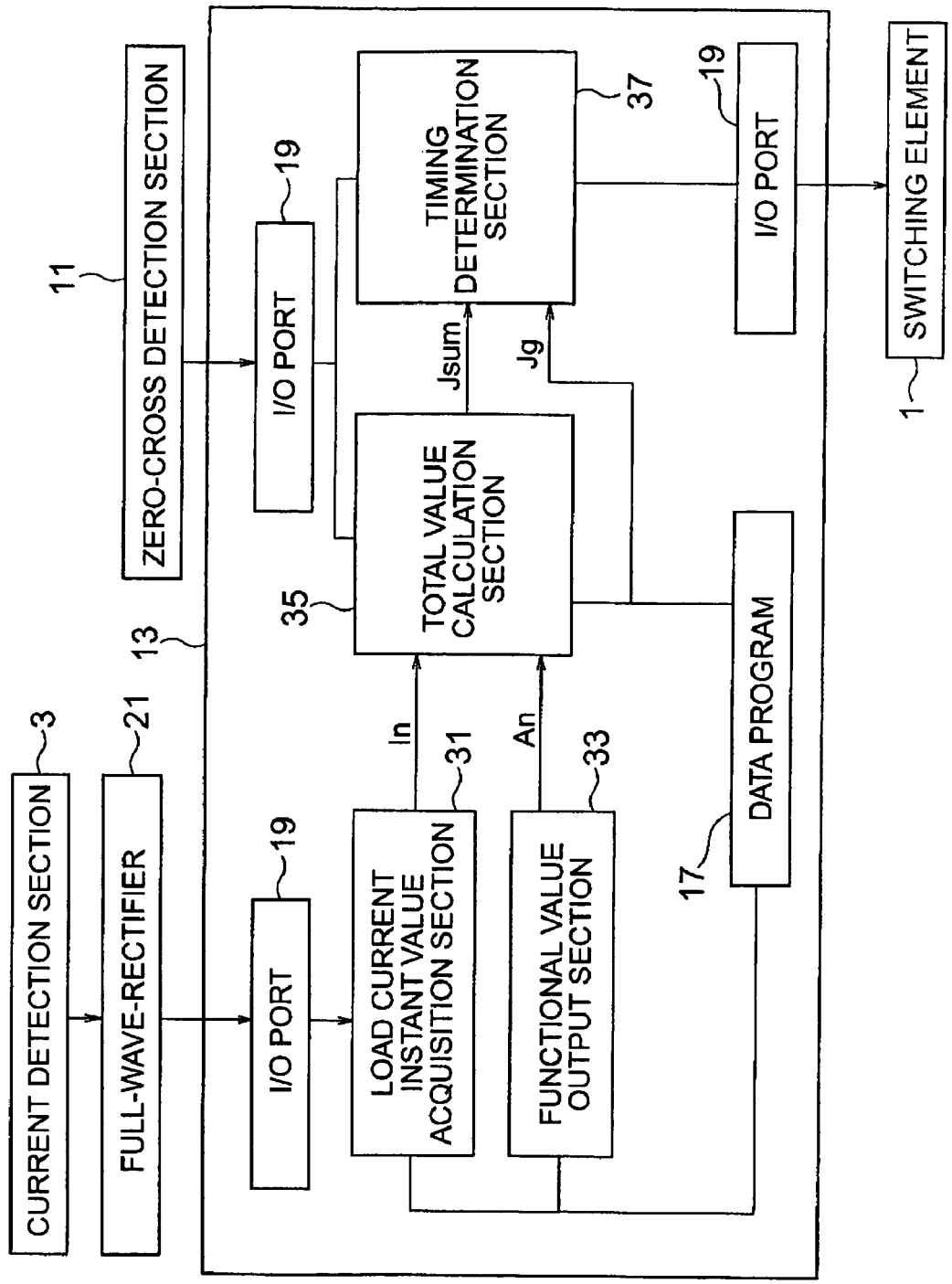
FIG. 4 is a block diagram illustrating a control section shown in FIG. 1.

Each function effected by control section 13 is described referring to FIG. 4. Control section 13 is comprised with an instant value acquisition section 31 for the load current, a functional value output section 33, a total value calculation section 35 and a timing determination section 37. Instant value acquisition section 31 acquires a load current instant value In detected by current detection section 3 at a prescribed sampling period and outputs the load current instant value In to total value calculation section 35. Functional value output section 33 acquires a sine-functional value An according to the number of times of sampling the load current instant value In and outputs the sine-functional value An to total value calculation section 35.

Total value calculation section 35 computes a compensation value Jn for the load current instant value In by multiplying the load current instant value In by the sine-functional value An. Total value calculation section 35 further calculates a load current compensation total value Jsum by adding the compensation value Jn by the number of times equal to that of sampling the load current instant value In and outputs the load current compensation total value Jsum to timing determination section 37. Timing determination section 37 compares the load current compensation total value Jsum with a predetermined load current reference value Jg to obtain a difference therebetween. Timing determination section 37 further calculates an instruction value Ts for the delay time based on the difference and outputs a trigger signal according to the instruction value Ts.

Figure 5:
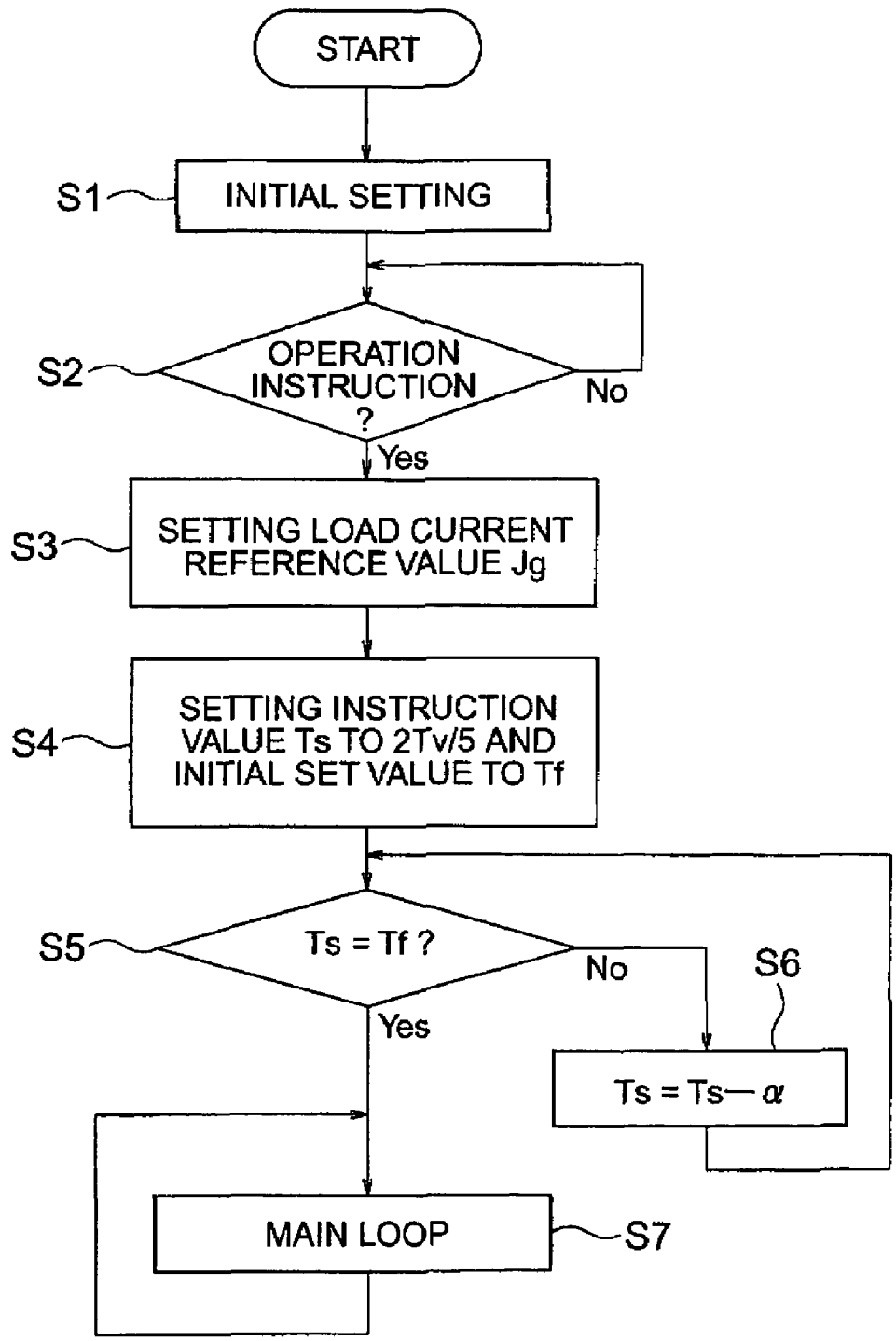
FIG. 5 is a flow chart illustrating a main routine executed by a microprocessor of the first embodiment.

As shown in FIG. 5, control section 13 carries out a main routine in accordance with a control program stored in memory 17 beforehand. In step S1, an initializing process is executed. In step S2, when an instruction signal from operation section 25 is detected, the Yes-path is taken and the load current reference value Jg is set in step S3. Otherwise, the No-path is taken and step S2 is repeated. In step S4, the instruction value Ts is set to the value (2×Tv/5), and an initial set value of the delay time is set to Tf (Ts>Tf), for example. Thus, the conducting angle φ of TRIAC 1 calculated by the formula (1) is 20 (%).

In step S5, the instruction value Ts is compared with the initial set value Tf of the delay time and the No-path is taken when the instruction value Ts is larger than the initial set value Tf of the delay time. The instruction value Ts is subtracted by a in step 6 and then the step 5 is executed. Steps 5 and 6 are repeated until the instruction value Ts reaches the initial set value Tf of the delay time and thereby gradually increasing the power voltage fed to the motor 7 shown in FIG. 1 to carry out a so-called soft-starting. When the instruction value Ts reaches the initial set value Tf of the delay time in step 5, the Yes-path is taken and a main loop is executed in step 7.

Figure 6:
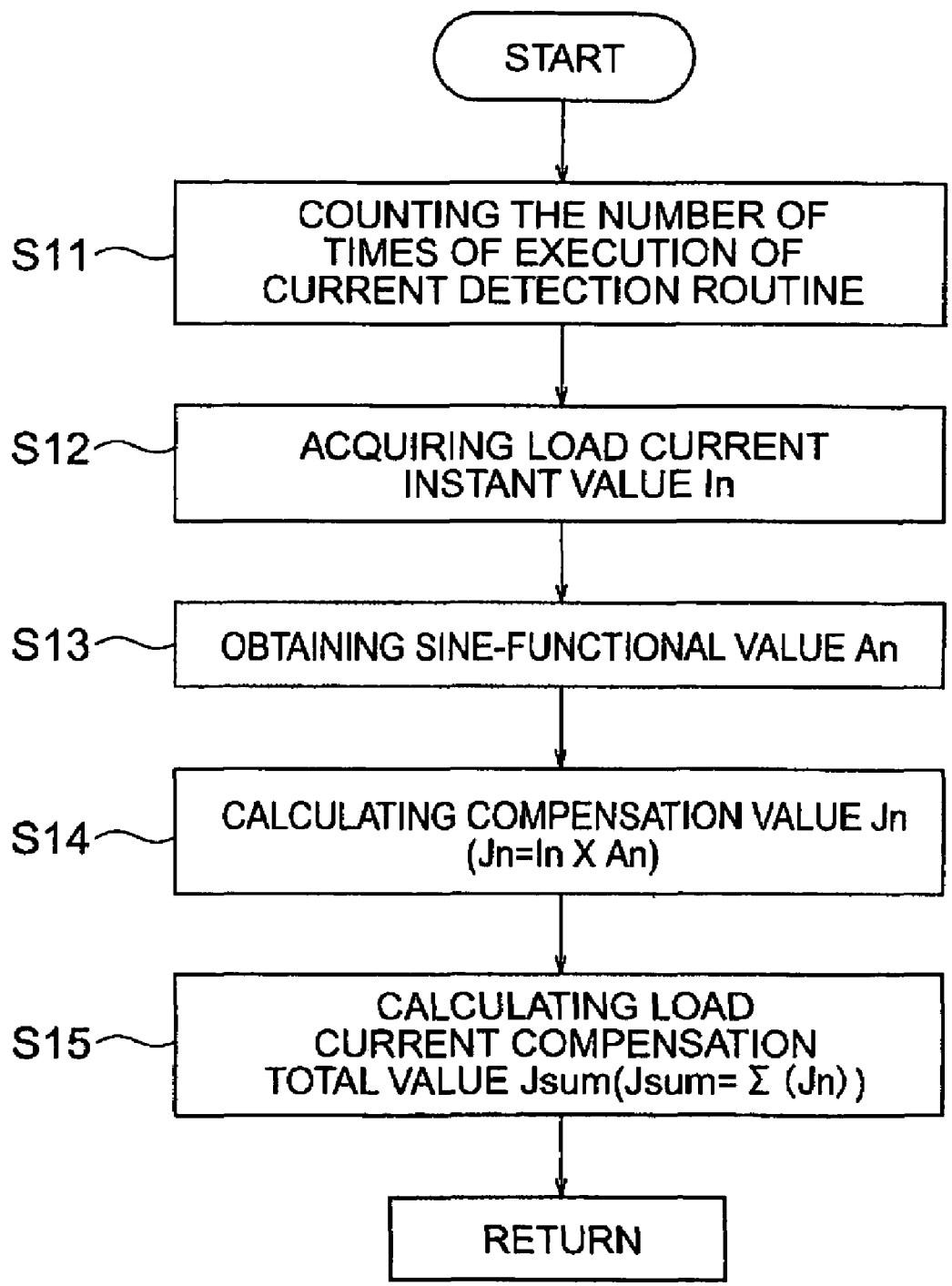
FIG. 6 is a flow chart illustrating a current detection routine by the microprocessor of the first embodiment.

Under the execution of the main loop, instant value acquisition section 31 regularly carries out a current detection routine shown in FIG. 6 with a timer (not shown).

The current detection routine executed by instant value acquisition section 31 will be described.

In step S11, the number of times that the current detection routine is carried out is counted. The execution of the current detection routine is the same as the execution of the current sampling and therefore, the timer sets a current sampling period. For example, when the sampling period is set to 0.2 msec under the A.C. power supply of 50 Hz, the current sampling is carried out at 100 times during one cycle (20 msec) of the A.C. power voltage. Therefore, it can be understood that when the number of times that the current detection routine is executed is counted 100 times, one cycle of the A.C. power voltage is completed.

Figure 3:
FIG. 3 is a view of a sine-function value table used in the first embodiment.

Further in step S12, instant value acquisition section 31 receives the load current instant value In from I/O port 19 and, in step S13, functional value output section 33 obtains a corresponding sine-functional value An from a sine-functional value table 27 stored in memory 17 shown in FIG. 3 based on the count value (the number of times of executing the current detection routine).

As shown in FIG. 3, sine-functional values are respectively set in the sine-functional value table 27 every difference in angle {θ(n)−θ(n−1)}. A difference in angle {θ(n)−θ(n−1)} is indicated by the expression (360°/(Tv/Ti)) wherein Ti is a current sampling period. For example, sine values are set in the table 27 as a sine-functional value An every 3.6 degrees when A.C. power supply is 50 Hz, and Ti is 0.2 (msec).

Sine-functional values An may be set in the table 27 in one cycle of the power voltage. However, since absolute values of the sine-functional values An in a first half cycle of the power voltage are the same as that in the successive half cycle, sine-functional values in the first half cycle may be set in the sine-functional value table 27 and then sine-functional values in the successive half cycle can be obtained from the sine-functional values in the table 27. Such operation is repeated to obtain sine-functional values.

For example, if the sampling period Ti is 0.2 (msec), sine-functional values A1–A50 are respectively set in the sine-functional value table 27. When the sine-functional value A1 is obtained from the table 27 if the count value of the number of times that the current detection routine (current sampling period) is executed is one (1), the same sine-functional value A1 is obtained from the table 27 if the count value is fifty-one (51).

As can be seen in FIG. 6, in step S14, total value calculation section 35 calculates the compensation value Jn for the load current instant value In by multiplying the load current instant value In and the sine-functional value An together. This calculation operation is repeated as described above. In step S15, compensation values Jn respectively calculated by the calculation operations are added to obtain the load current compensation total value Jsum. For example, compensation values Jn of fifty (50) times of calculation from one zero-crossing point to the next zero-crossing point of the power voltage are added if the calculation period is a half cycle of the power voltage (50 Hz) and the sampling period Ti is 0.2 (msec), i.e., 20 (msec)/2/0.2 (msec)=50. Further, for example, the compensation values Jn of one hundred (100) times of calculation from a first zero-crossing point to a third zero-crossing point (one cycle) of the power voltage are added if the calculation period is one cycle of the power voltage (50 Hz). Thereafter, the operation is returned to the step S7 (main loop) shown in FIG. 5.

Figure 7:
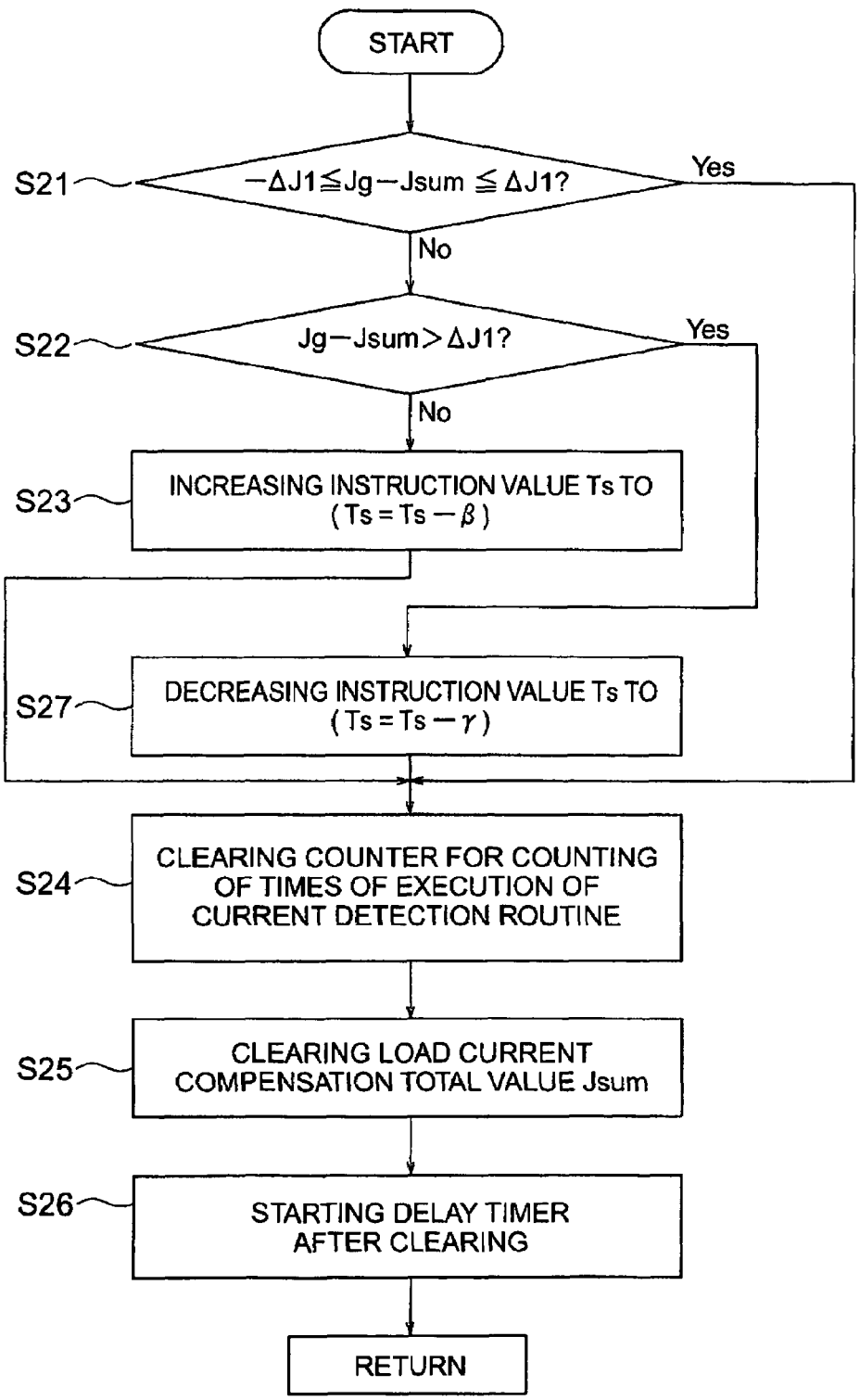
FIG. 7 is a flow chart illustrating a trigger signal output routine by the microprocessor of the first embodiment.

Under the execution of processes in the main loop in step S7, control section 13 carries out a zero-cross routine as shown in FIG. 7 when detecting the zero-crossing point based on the zero-cross detection signal from zero-cross detecting section 11. In the zero-cross routine, timing determination section 37 determines the instruction value Ts for the delay time that instructs an output timing of the trigger signal.

A concrete example of the determination process of the instruction value Ts will be described with reference to FIG. 7. In step S21, timing determination section 37 compares the load current reference value Jg with the load current compensation total value Jsum. When a difference between the load current reference value Jg and the load current compensation total value Jsum is within ΔJ1, the Yes-path is taken and the current instruction value Ts is maintained. Otherwise, the No-path is taken. In steps S24 and S25, the counter which counts the number of times of execution of detecting current is cleared and the load current compensation total value Jsum is also cleared. Then, the delay timer is cleared and restarted in step S26 and the operation is returned to step S7 in which a main loop is executed. In this case, it is determined by motor control apparatus 100 that motor 7 is operated within a preset power consumption range.

In step S22, when the value obtained by subtracting the load current compensation total value Jsum from the load current reference value Jg is greater than ΔJ1, the Yes-path is taken. The instruction value Ts is decreased by γ in step S27 and then the above-described steps S24, S25 and S26 are executed. In this case, it is determined by motor control apparatus 100 that the power consumption by motor 7 is under the preset range. Thus, the conducting angle φ of TRIAC 1 is increased so that the electric power applied to motor 7 can be increased.

When the No-path is taken in step S22, the instruction value Ts is increased by β in step S23. Thereafter, the above-described steps S 24, S25 and S26 are executed. In this case, it is determined by motor control apparatus 100 that the power consumption by motor 7 is above the preset range. Thus, the conducting angle φ of TRIAC 1 is decreased so that the electric power applied to motor 7 can be decreased.

Figure 8:
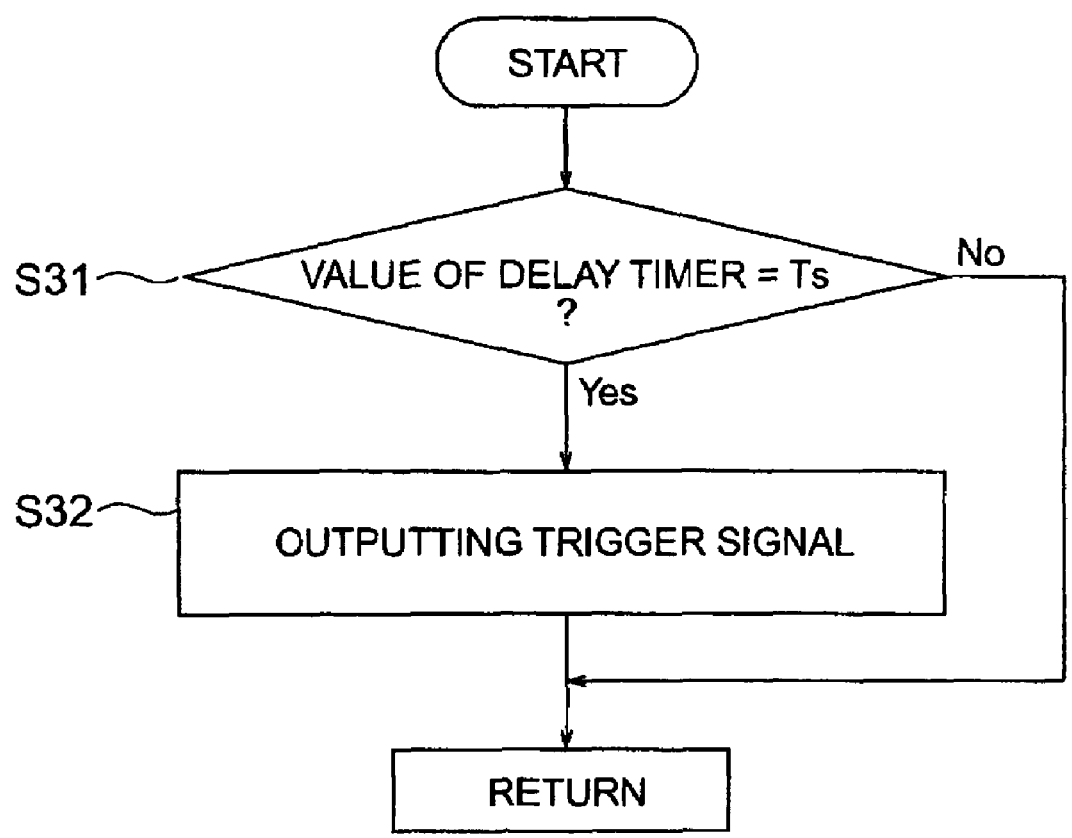
FIG. 8 is a flow chart illustrating a zero-cross routine by the microprocessor of the first embodiment.

At last, timing determination section 54 starts count of the delay time from the zero-crossing point by the delay timer (not shown) which has been cleared in step S26 and regularly executes a trigger signal output routine as shown in FIG. 8. In step S31, when the count value by the delay timer does not reach the instruction value Ts, the No-path is taken and the operation is returned to step S7. Otherwise, the Yes-path is taken and the trigger signal is output to TRIAC 1 in step S32 and the operation is returned to step S7.

In the above-described embodiment, motor control apparatus 100 calculates the load current compensation total value Jsum based on the load current instant value In and the sine-functional value An which is set on the basis of the zero-crossing point of A.C. power voltage. Thus, the load current compensation total value Jsum is a load current data which is calculated considering a phase difference between the power voltage waveform and the load current waveform.

In addition, the power consumption of motor 7 is controlled by determining the instruction value Ts for the delay time of the trigger signal in accordance with a difference between the load current compensation total value Jsum and the predetermined load current reference value Jg. In a prior art, variation in phase difference between the power voltage waveform and the load current waveform occurs due to variation in windings of respective motors and, as a result of that, variation in power consumption among motors occurs. In such a case, motor control apparatus 100 of this embodiment can decrease variation in power consumption among motors.

In general, the A/D conversion process may take time in comparison with the computing process within the microprocessor 15. However, motor control apparatus 100 can carry out control of power consumption which reflects the phase difference between the power supply waveform and the load current waveform within a relatively short time. This is because that motor control apparatus 100 of this embodiment only executes the A/D conversion process of current value.

Further, in the above-described embodiment, the load current compensation total value Jsum is obtained by adding compensation values Jn for respective load current instant values In during a prescribed sampling period, for example, a half cycle of power voltage. Thus, the calculated load current compensation total value Jsum is not greatly affected even if the load current instant value In is adversely affected by electrical noise during the sampling period.

In addition, the construction of motor control apparatus 100 of this embodiment can be simplified. This is because that it is not necessary to utilize a specific means for detecting a physical amount of the motor except zero-cross detecting section 11 and current detection section 3.

In the above-described functional value output section 33, the sine-functional value An is taken from sine-functional value table 27. However, it is not limited to this method, and thus, an exclusive sine-functional value calculator may be provided to the microprocessor 15. The sine-functional value An may also be calculated by the exclusive sine-functional value calculator every sampling period, successively.

In the above-described control section 13, the load current instant value In is also obtained by regularly executing the current detection routine during the period (non-conducting period) between detection of the zero-crossing point of the power voltage and the output of the trigger signal to TRIAC 1. However, it may halt the execution of the current detection routine during this period (non-conducting period). Since supply of power voltage to the motor is stopped during this period, the load current is theoretically zero. In contrast to this theory, the load current instant value In may not become zero practically because of electrical noise. Thus, there may be a case that the load current compensation total value Jsum during this period does not also become zero. However, as described above, if the execution of the current detection routine is stopped during this period (non-conducting period), an error in the load current compensation total value Jsum caused by electrical noise can surely become zero because the load current instant value In is not generated during this period.

Figure 9:
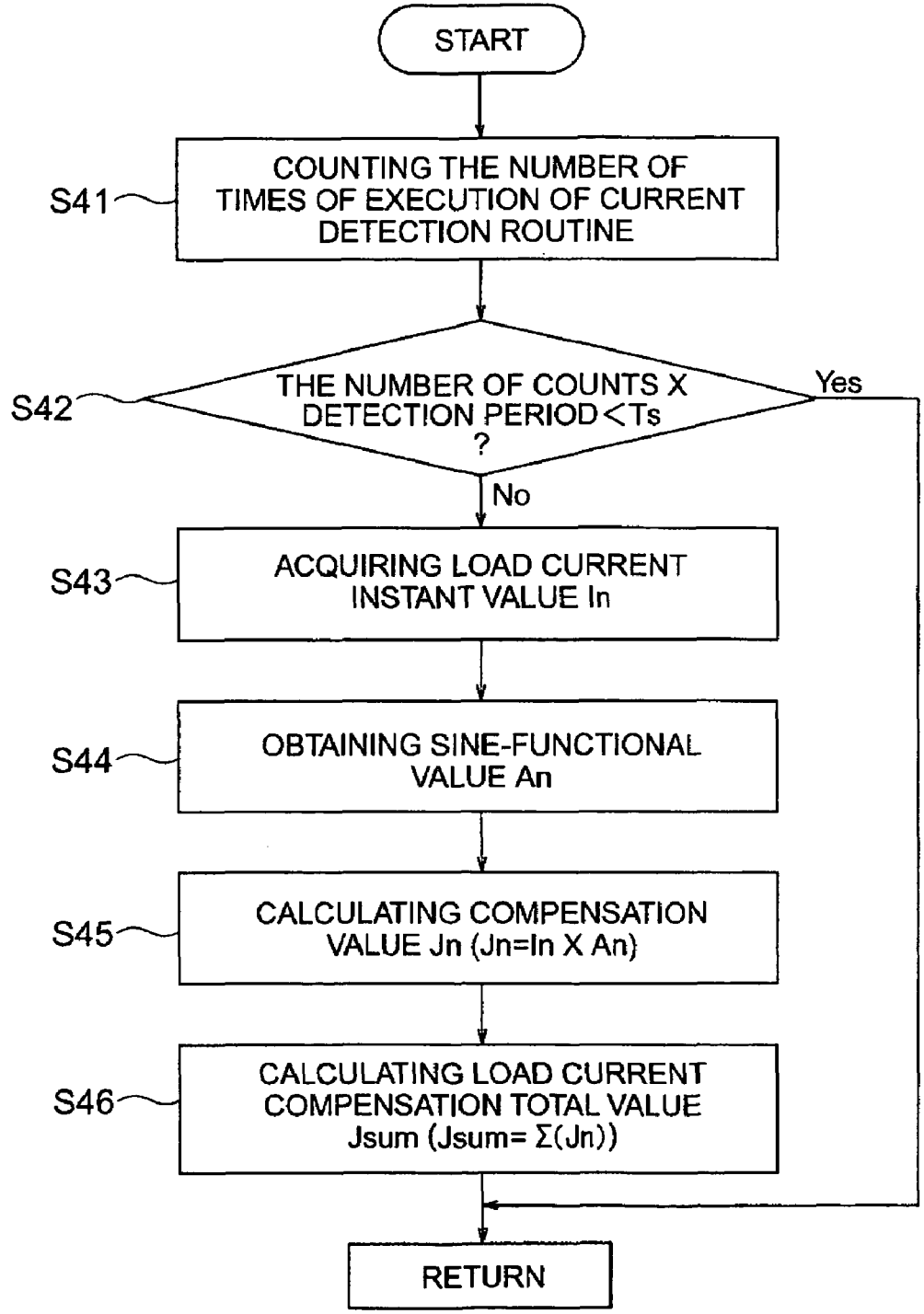
FIG. 9 is a flow chart illustrating modification of the current detection routine shown in FIG. 6.

The above-described control is shown in FIG. 9. FIG. 9 shows a flow chart indicating a current detection routine based on the above description. In step S41, the number of times that the current detection routine is executed is counted. In step S42, the elapsed time obtained by multiplying the counted value in step S41 with the detecting period (sampling period) of the load current instant value In and the instruction value Ts for the delay time are compared. The Yes-path is taken when the elapsed time is smaller than the instruction value Ts. The operation is returned to step S7. Otherwise, the No-path is taken. Load current instant value acquisition section 31 receives the load current instant value In through I/O port 19 in step S43 and outputs the load current instant value In to total value calculation section 35. Functional value output section 33 obtains the sine-functional value An from the sine-functional value table 27 based on the counted value of the number of times of execution of the current detection routine in step S44 and outputs the sine-functional value An to total value calculation section 35. Then, total value calculation section 35 calculates the compensation value Jn by multiplying the load current instant value In by the sine-functional value An in step S45. In step S46, the load current compensation total value Jsum is obtained by adding compensation values Jn obtained till then and the operation is returned to step S7.

As described above, by the execution of the above-described current detection routine, the compensation value Jn is calculated based on the load current instant value In and sine-functional value An which are obtained during the period (conducting period of TRIAC) from output of the trigger signal to detection of the next zero-crossing point of power voltage and thus, the load current compensation total value Jsum can finally be obtained by adding compensation values Jn obtained till then.

This operation can improve the accuracy of the load current compensation total value Jsum that is calculated in a unit of half cycle between consecutive zero-crossing points of power voltage. As a result, variation in power consumption of motors 7 can also be improved. In addition, the workload of microprocessor 15 decreases and thus, microprocessor 15 can carry out other operations, in stead.

It should be noted that it is not necessary to execute step S42 at a timing shown in FIG. 9. It may execute step S42 at any timing before the execution of step S46 (calculation of load current compensation total value Jsum). In particular, since it takes time to carry out the A/D conversion process in comparison with the arithmetic operation within microprocessor 15, it is preferable to execute step S42 before step S43 is executed.

In the above-described embodiment, a waveform detected by current detection section 3 is full-wave-rectified by full-wave rectifier 21 to produce the rectified load current detecting waveform as shown in (e) of FIG. 2 and the load current compensation total value Jsum is calculated by sampling the rectified load current detecting waveform at a prescribed sampling period every half cycle of power voltage. However, it is not limited to the above-described operation. It may carry out following processes that the waveform detected by current detection section 3 is half-wave-rectified by a diode instead of full-wave rectifier 21 to produce a load current detecting waveform indicated by dotted line as shown in (e) of FIG. 2 and the load current compensation total value Jsum is calculated by sampling at a prescribed sampling period every half cycle of power voltage using this load current detecting waveform. Inventors have confirmed that effect of this embodiment could be obtained without any hindrance even the load current compensation total value Jsum was calculated based on the half-rectified load current detecting waveform as described above.

Furthermore, the load current compensation total value Jsum may be calculated every other half cycle under the use of a full-wave-rectifier by a software processing (program) without using circuit elements, such as, e.g., diode. To realize this process in the current detection routine, the load current compensation total value Jsum in a first half cycle is firstly calculated. In a second half cycle consecutive to the first cycle, the load current compensation total value Jsum is not calculated and thus, the operation is returned to the main routine.

As described above, since the road current compensation total value Jsum is calculated every other half cycle, the workload of microprocessor 15 decreases and thus, microprocessor 15 can carry out other operations.

In the above-described first embodiment, sine-functional values A1–An corresponding to the number of times of sampling in a half cycle of power voltage are set in the sine-functional value table 27. However, in the embodiment, it is not limited to this table 27 and thus sine-function values A1–An corresponding to the number of times of sampling at least in one-fourth cycle may be set in the sine-functional value table 27. Since sine-functional values A1–An are determined based on the sine-wave, functional value output section 33 can output sine-functional values A1–An in one cycle by the following processes if sine-functional values A1–An in one-fourth cycle are set in the sine-functional value table 27. Functional value output section 33 firstly outputs sine-functional values A1–An in order in a first one-fourth cycle and then outputs sine-functional values An–A1 in order in a second one-fourth cycle. Functional value output section 33 further outputs sine-functional values A1–An in order in a third one-fourth cycle and then finally outputs sine-functional values An–A1 in order in a remaining one-fourth cycle. By the above-described method, the amount of data set in the sine-functional value table 27 reduces and thus the store-area of memory 17 can be saved.

In the above-described embodiment, processes carried out by instant value acquisition section 31, functional value output section 33, total value calculation section 35 and timing determination section 37 of control section 13 are performed by a software (program) stored in memory 17. It may be carried out by a circuitry arrangement, instead of software, which has functions performed by the software.

Second Embodiment

In this embodiment, an electric appliance, e.g., vacuum cleaner, to which the above-described first embodiment (motor control apparatus) is applied will be described.

Figure 10:
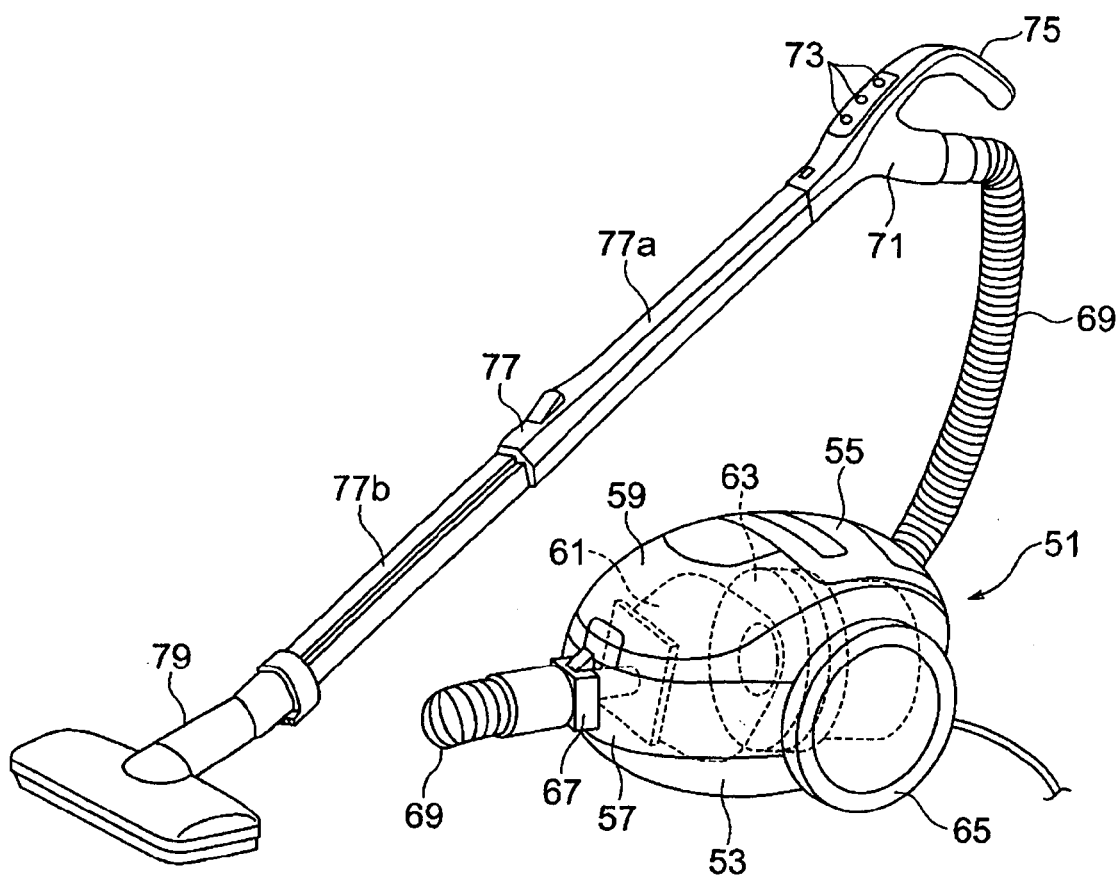
FIG. 10 is a perspective view illustrating an electric vacuum cleaner according to a second embodiment of the present invention.

As shown in FIG. 10, a vacuum cleaner 51 includes a lower case 53 whose upper surface is open, an upper case 55, a bumper 57 and a lid 59. The rear part of lower case 53 is closed by upper case 55. Bumper 57 is sandwiched between circumferential edges of lower case 53 and upper case 55 and is joined therewith. Lid 59 is swingably provided to the front part of lower case 53 to open and close the front part.

A bag-shaped filter 61 (hereinafter referred to as a filter) and an electric blower 63 are located in series inside vacuum cleaner 51. An airflow generated by blower 63 is led through filter 61 to separate dust from the airflow.

A caster (not shown) is provided on the rear surface of front part of cleaner 51 in forwarding direction and a pair of driven wheels 65 is respectively provided to opposite sides of the rear part of cleaner 51.

An intake opening 67 is formed at a center of the front wall of cleaner 51 to draw air from the outside into the inside of cleaner 51. One end of a flexible cylindrical hose 69 that is extendable is separably connected in fluid communication to intake opening 67 and the other end is fixed in fluid communication to a grip section 71.

Grip section 71 includes a plurality of operation buttons 73 each of which is selectively operated to instruct one of operation modes of electric blower 63 including a stop mode. Grip section 71 further includes a handhold portion 75 which is grasped by an operator when cleaning. One end of an extendable pipe 77 is separably connected to the other end of grip section 71 so that extendable pipe 77 fluidly communicates with cylindrical hose 69 through grip section 71. Extendable pipe 77 includes a first pipe 77a having a larger diameter and a second pipe 77b having a smaller diameter which is slidably inserted into the first pipe 77a. Pipe 77 is extended by sliding second pipe 77b against first pipe 77a. As shown in FIG. 10, a floor brush 79 is separably connected to the other end of extendable pipe 77. Floor brush 79 has an opening through which dust on the floor is taken with airflow into vacuum cleaner 51.

In the inside of vacuum cleaner 51, a circuit board on which an electric blower control apparatus is functionally realized is mounted. The construction of the electric blower control apparatus is basically the same as that of motor control apparatus 100 shown in FIG. 1 in one embodiment. However, in this embodiment, electric blower 63 including motor 7 with fan (not shown), instead of motor 7 alone, is used and grip section 71 is also used, instead of operation section 25.

Figures 11, 12:
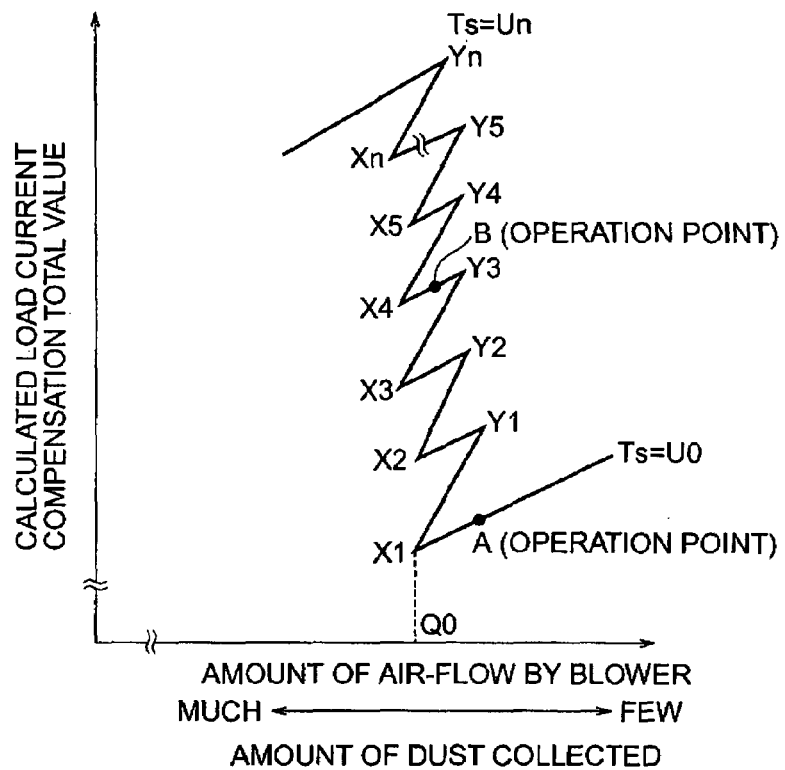
FIG. 11 is a graph illustrating a relationship between an intake-airflow amount of an electric blower and a total power value when variations in an electric power set value and an electric threshold value are set as parameters during the operation of the vacuum cleaner shown in FIG. 10.
FIG. 12 is a view illustrating a data table used in the second embodiment.

In the electric blower control apparatus in this embodiment, a data table 81 shown in FIG. 12 is stored in memory 17 in FIG. 1. In the data table 81, delay time set values of n+1, U0, U1, U2, - - -, Un (Un< - - - <U2<U1<U0) are set in a first column as the instruction value Ts for the delay time (output timing of trigger signal), load current reference values of n, X1, X2, X3, - - -, Xn (Xn> - - - >X3>X2>X1) are set in a second column as a first load current reference value Jg1 corresponding to delay time set values of the instruction value Ts, and load current reference values of n, Y1, Y2, Y3, - - -, Yn (Yn> - - - >Y3>Y2>Y1) are also set in a third column as a second load current reference value Jg2. As shown in FIG. 11, relation in a relative value amount between the first load current reference value Jg1 and the second load current reference value Jg2 are as follows:

$$X1<X2<Y1<X3<Y2<X4<Y3<X5< - - - , Xn<Yn-1<Yn$$

Operation of vacuum cleaner 51 will be described. In the electric blower control apparatus, control section 13 outputs a trigger signal to TRIAC 1 to drive electric blower 63. When no dust is collected with filter 61, control section 13 selects the value U0 from the data table 81 and sets the value U0 as the instruction value Ts. At this time, for example, the operation point of electric blower 63 is indicated by a character A as shown in FIG. 11.

Under this state, electric blower 63 is driven and thus the cleaning operation begins to collect dust with filter 61. As the cleaning operation proceeds, dust collected within filter 61 increases and thus the airflow-resistance of filter 61 increases resulting in decrease in intake-airflow amount of electric blower 63. In response to this decrease in intake-airflow amount, the road current compensation total value Jsum gradually falls toward the load current reference value X1 from the operation point A.

When the road current compensation total value Jsum goes below the load current reference value X1, the instruction value Ts for the delay time (output timing of trigger signal) is changed from the value U0 to the value U1 (U0>U1). By this operation, the conducting angle of TRIAC 1 increases and thus the intake-airflow amount of electric blower 63 increases. At this moment, the road current compensation total value Jsum becomes the value Y1 and the power consumption of electric blower 63 also increases.

After that, as the cleaning operation further proceeds, the airflow-resistance of filter 61 further increases also and thus the intake-airflow amount of electric blower 63 further decreases. At this time, the road current compensation total value Jsum falls toward the load current reference value X2.

When the road current compensation total value Jsum falls below the load current reference value X2, the instruction value Ts for the delay time is changed from the value U1 to the value U2 (U1>U2). By this operation, the conducting angle of TRIAC 1 further increases and the intake-airflow amount of electric blower 63 further increases. At this moment, the road current compensation total value Jsum becomes the value Y2 and the power consumption of electric blower 63 further increases.

As can be understood from the above description, when the load current compensation total value Jsum goes below respective load current reference values X1, X2, X3, X4, - - - as the cleaning operation proceeds, the instruction value Ts is changed to respective values U0, U1, U2, U3, - - - . After the load current compensation total value Jsum finally goes below the load current reference value Xn and thus the instruction value Ts becomes the value Un, the instruction value Ts is not changed even if the load current compensation total value Jsum further falls after that, determining that enough amount of dust is collected within filter 61. In this case, when the load current compensation total value Jsum further falls below a prescribed reference value, the operator is urged to change filter 61 by the indication of LED (Light Emitting Diode), for example, determining that filter 61 is full.

In the above-described second embodiment also, the calculated load current compensation total value Jsum is compared with a predetermined load current reference value Jg1 to obtain a difference therebetween and the instruction value Ts is changed based on the difference so that the power consumption of electric blower 63 falls within a prescribed range. In this case, in response to the intake-airflow amount of electric blower 63, the load current reference value Jg1 is changed and thus the prescribed range of power consumption is also changed.

Figure 13:
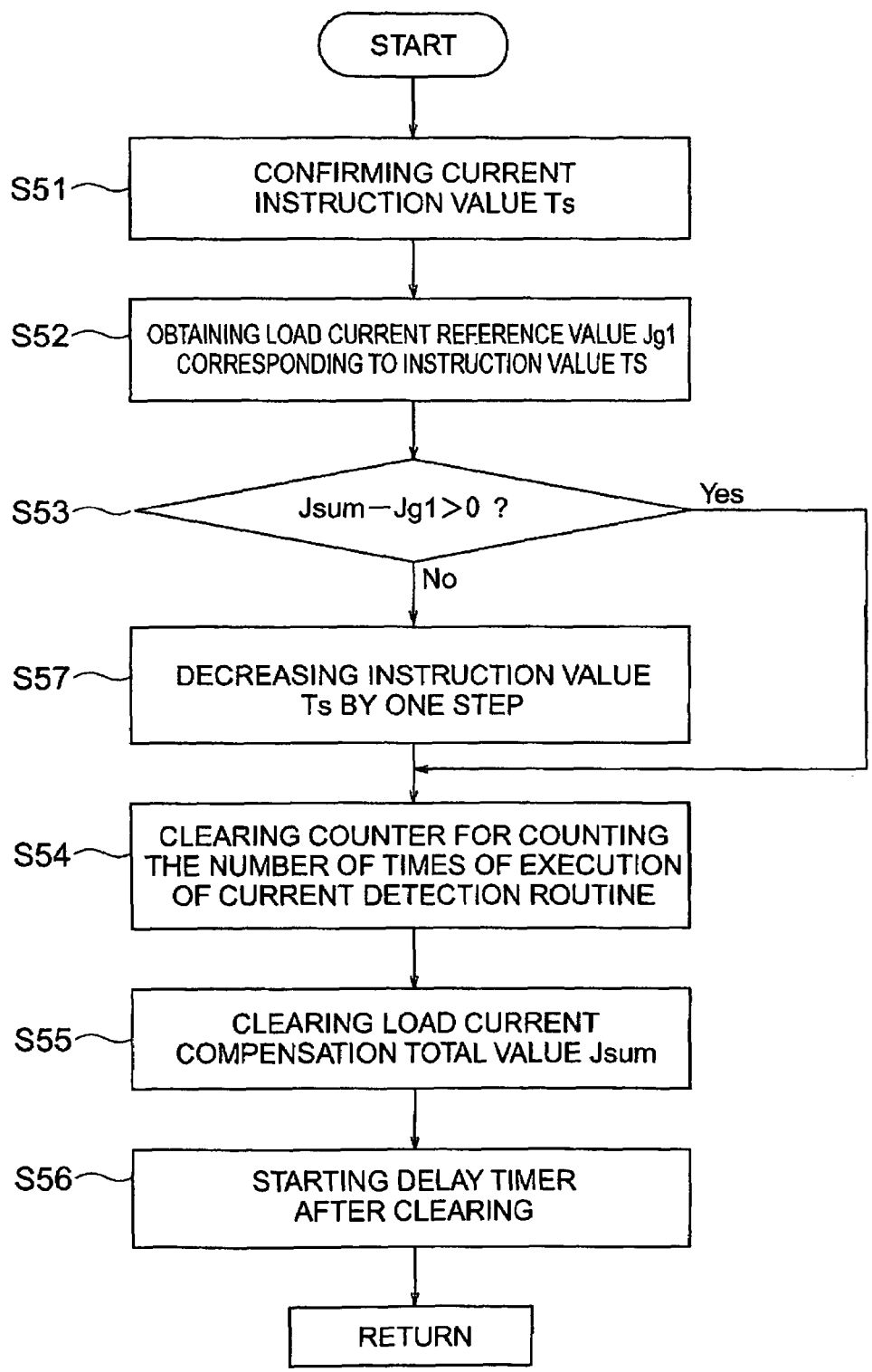
FIG. 13 is a flow chart illustrating a zero-cross routine by the microprocessor in the second embodiment.

Referring to FIG. 13, a zero-cross operation routine that indicates control of electric blower 63 by control section 13 will be described.

Timing determination section 37 confirms the present instruction value Ts in step S51 and obtains the load current reference value Jg1 corresponding to the present instruction value Ts in step S52. In step S53, the load current reference value Jg1 obtained in step S52 is compared with the load current compensation total value Jsum, the Yes-path is taken when the load current compensation total value Jsum is greater than the load current reference value Jg1. Otherwise, the No-path is taken. In steps S54 and S55, the counter which counts the number of times of execution of current detection is cleared and the load current compensation total value Jsum is also cleared. Then, the delay timer is cleared and restarted in step S56 and the operation is returned to step S7 in which a main loop is executed. When the No-path is taken in step S53, the instruction value Ts decreases by one step in data table 81. For example, if the instruction value Ts is the value U0, the value U0 is changed to the value U1. After that, the above-described steps S54, S55, S56 are sequentially executed and the operation is returned to step S7.

As being described, in the second embodiment also, power consumption of electric blower 63 can be controlled, taking a phase-difference between the voltage-waveform of power supply and the load current-waveform into consideration and thus the second embodiment achieves similar effect to the first embodiment.

Further, in the second embodiment, based on the amount of dust in filter 61, the load current compensation total value Jsum is calculated and the instruction value Ts for the delay time and the load current reference value Jg1 are changed thereby controlling the power consumption of electric blower 63 within a predetermined appropriate range. Thus, the air-suction-ability of vacuum cleaner 51 can be maintained at a suitable level. In addition, variation in the air-suction-ability of vacuum cleaners can be minimized even if variation in impedance of windings among electric blowers occurs.

Still further, in the second embodiment, timing determination section 37 obtains the load current value Jg1 from the data table 81 having n numbers of load current reference values X1, X2, X3, - - - , Xn in response to the instruction value Ts of the time. However, it may take a method that timing determination section 37 outputs a trigger signal by the following formula:

$$Xn = X1 + K^*(n-1)^*Ts$$

wherein Xn is a n-th load current reference value, X1 is a first load current reference value, K is a constant obtained from an experimental result.

In the above-described second embodiment, control is performed based on the assumption that the calculated load current compensation total value Jsum decreases as the amount of dust in filter 61 increases and the airflow-resistance of filter 61 also increases. However, it may be considered that the airflow-resistance decreases and thus the intake-airflow amount sharply increases due to the relationship in contact between floor brush 89 and the floor and a degree of curve of hose 69 during cleaning operation. Taking such operational conditions into consideration, it is required to use the second load current reference value Jg2 (Yn) different from the first load current reference value Jg1 (Xn) shown in FIGS. 11 and 12.

For example, if the load current compensation total value Jsum goes above the load current reference value Y3 when the operational point of electric blower 63 is at the operation point B shown in FIG. 11, the instruction value Ts for determining the timing of outputting trigger signal is changed from U3 to U2 and thus the conducting angle of TRIAC 1 is decreased resulting in decrease in the intake-airflow amount of electric blower 63. At this moment, the load current compensation total value Jsum becomes X3 and the power consumption of electric blower 63 decreases.

The above-described operation will be described in more detail referring to FIG. 14.

Figure 14:
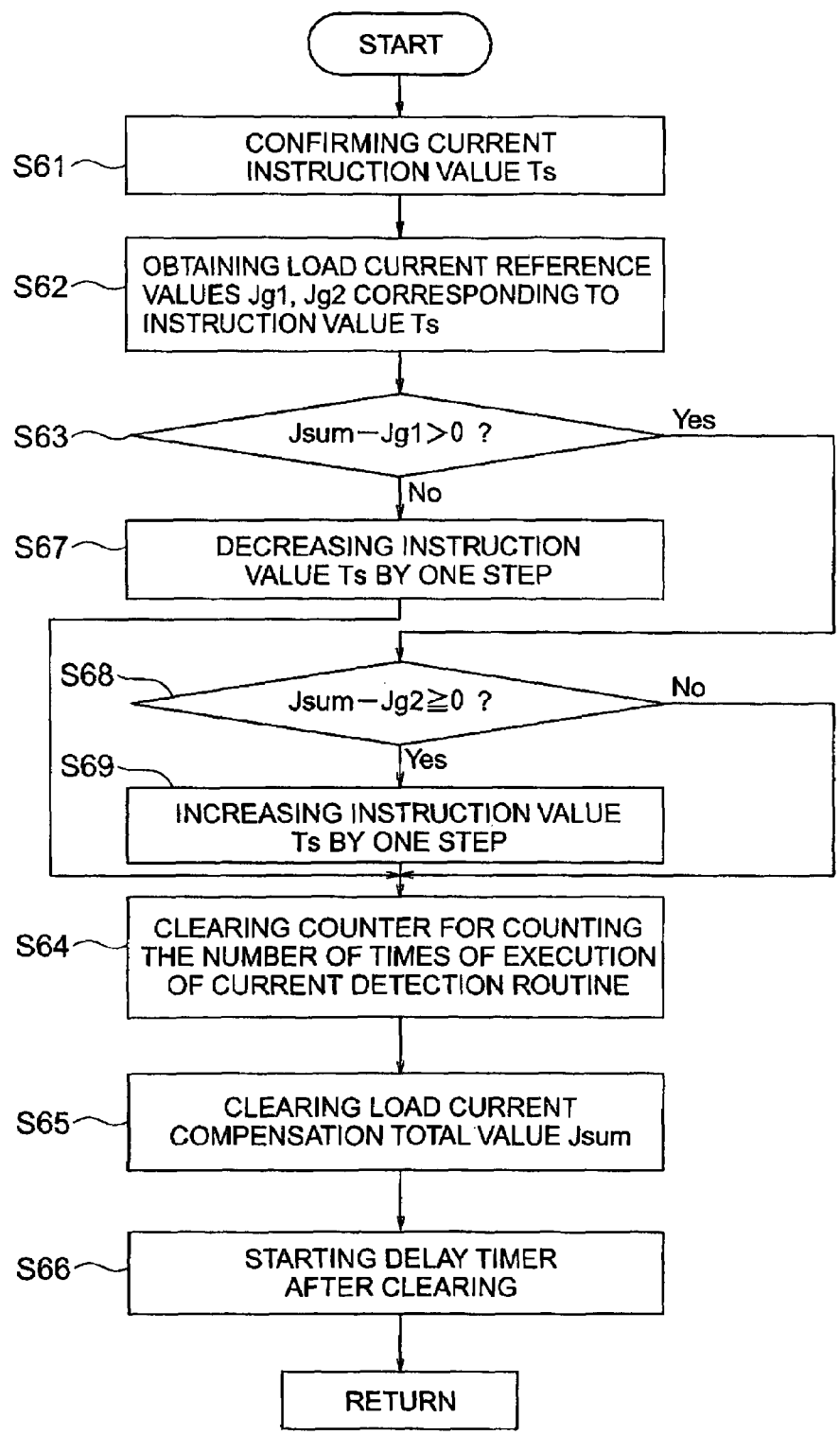
FIG. 14 is a flow chart illustrating modification of the zero-cross routine in the second embodiment.

The routine shown in FIG. 14 is a zero-cross routine in which steps S68 and S69 are added to the routine as shown in FIG. 13. In this routine, steps S61, S63–S67 in FIG. 14 are the same as steps S51, S53–S57 in FIG. 13. In step S62, first and second load current reference values Jg1 and Jg2 are obtained, whereas only the first load current reference value Jg1 is obtained in step S52.

In step S68 in FIG. 14, when the load current compensation total value Jsum is greater than or equal to the second load current reference value Jg2, the Yes-path is taken and the instruction value Ts is increased by one step from U3 to U2 if the instruction value Ts is U3, for example in step S69. The delay time of outputting a trigger signal from timing determination section 37 becomes longer. When the No-path is taken in step S68, step S64 is executed. Operations in steps S64, S65 and S66 are already described and therefore such operations are not repeated. As described above, in this routine, the load current compensation total value Jsum is calculated, and the instruction value Ts, first and second load current reference values Jg1 and Jg2 are changed in response to the amount of dust in filter 61. Power consumption of electric blower 63 is thus controlled within a prescribed appropriate range.

In the above embodiment, it is not necessary to set an interval $\Delta$ Un (Un−Un−1) of the instruction value Ts constant. Intervals $\Delta$ Xn (Xn−Xn−1) and $\Delta$ Yn (Yn−Yn−1) of first and second load current reference values Jg1 and Jg2 are also. It may be set based on the various use of motor to be controlled.

Furthermore, in the above-described second embodiment, the present invention is applied to a vacuum cleaner. However, the present invention can also be applied to electric appliances using a motor control, such as, e.g., electric cooking apparatus, electric machine tools, etc.

The present invention has been described with respect to specific embodiments. However, other embodiments based on the principles of the present invention should be obvious to those of ordinary skill in the art. Such embodiments are intended to be covered by the claims.

What is claimed is:

1. A motor control apparatus which controls operation of an A.C. driven motor, comprising:
   a switching element which is activated by a trigger signal;
   a zero-cross detection section configured to detect a zero-crossing point of A.C. power voltage applied to the motor;

a current detection section configured to detect a load current flowing through the motor; and a control section associated with the zero-cross detection section and the current detection section, configured to supply the trigger signal to the switching element, the control section including, a first means for obtaining a load current instant value by sampling the load current detected by the current detection section at a prescribed sampling period, a functional value output means for outputting a sine-functional value in response to the prescribed sampling period of the load current, a total value calculation means for obtaining a compensation value for each load current instant value based on the load current instant value from the first means and the sine-functional value from the functional value output means to calculate a load current compensation total value by adding the compensation values over the number of times of sampling, and a timing determination means for obtaining a difference by comparing the load current compensation total value with a load current reference value to determine an output timing of the trigger signal to the switching element in response to the difference so that power consumption of the motor falls within a predetermined range.

2. An apparatus according to claim 1, wherein the total value calculation means outputs the trigger signal to the motor first and then calculates the compensation value for the load current instant value.

3. An apparatus according to claim 1, wherein the total value calculation means calculates the load current compensation total value at least every half period of A.C. power voltage applied to the motor.

4. An apparatus according to claim 1, wherein the control section includes a sine-functional value table having sine-functional values the number of which is equal to the number of times of sampling of the load current between a period shorter than the period of A.C. power voltage to the motor and a period greater than one-fourth period of A.C. power voltage, and the functional value output means reads out a corresponding sine-functional value from the sine-functional value table in response to the sampling period of the load current to repeatedly output a corresponding sine-functional value within the period of A.C. power voltage.

5. An apparatus according to claim 1, wherein the timing determination means advances the output timing of the trigger signal to the switching element when the load current compensation total value is smaller than the load current reference value.

6. An apparatus according to claim 1, wherein the control section includes a plural number of the load current reference values each of which is previously set corresponding to each output timing of the trigger signals by the control section.

7. An apparatus according to claim 1, wherein the control section includes a plural number of the load current reference values, and the timing determination means changes the load current reference value from one to another in response to the change of the output timing of the trigger signal.

8. An electric appliance comprising:

an A.C. driven motor;

an operation section driven by the motor; and a motor control apparatus comprising, a switching element which is activated by a trigger signal, a zero-cross detection section configured to detect a zero-cross point of A.C. power voltage applied to the motor, a current detection section configured to detect a load current flowing through the motor, and a control section associated with the zero-cross detection section and the current detection section, configured to supply the trigger signal to the switching element, wherein the control section includes;

a first means for obtaining a load current instant value by sampling the load current detected by the current detection section at a prescribed sampling period, a functional value output means for outputting a sine-functional value in response to the prescribed sampling period of the load current, a total value calculation means for obtaining a compensation value for each load current instant value based on the load current instant value from the first means and the sine-functional value from the functional value output means to calculate a load current compensation total value by adding the compensation values over the number of times of sampling, and a timing determination means for obtaining a difference by comparing the load current compensation total value with a load current reference value to determine an output timing of the trigger signal to the switching element in response to the difference so that power consumption of the motor falls within a predetermined range.

* * * * *